US006971294B1

(12) United States Patent
Shinohara et al.

(10) Patent No.: US 6,971,294 B1
(45) Date of Patent: *Dec. 6, 2005

(54) NUMERICALLY CONTROLLED LATHE AND METHOD OF MACHINING WORK USING THIS NUMERICALLY CONTROLLED LATHE

(75) Inventors: Hiroshi Shinohara, Tokorozawa (JP); Yuji Miyazaki, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/220,802

(22) PCT Filed: Mar. 10, 2000

(86) PCT No.: PCT/JP00/01466

§ 371 (c)(1),
(2), (4) Date: Sep. 27, 2002

(87) PCT Pub. No.: WO01/66289

PCT Pub. Date: Sep. 13, 2001

(51) Int. Cl.[7] .............................................. B23B 3/30
(52) U.S. Cl. .............................. 82/1.11; 82/47; 82/118; 82/129
(58) Field of Search .................... 82/1.11, 118, 120, 82/121, 129, 133, 134

(56) References Cited

U.S. PATENT DOCUMENTS

| 4,612,832 | A | * | 9/1986 | Ushigoe et al. ................ 82/129 |
| 5,105,694 | A | * | 4/1992 | Smith et al. ................... 82/138 |
| 5,127,140 | A | * | 7/1992 | Oiwa et al. ................... 29/27 C |
| 5,134,910 | A | * | 8/1992 | Morikuni et al. ............ 82/1.11 |
| 6,024,001 | A | * | 2/2000 | Oya ............................. 82/1.11 |
| 6,742,422 | B1 | * | 6/2004 | Shinohara et al. ........... 82/1.11 |

FOREIGN PATENT DOCUMENTS

| JP | 58056701 | A | * | 4/1983 | ............ B23B 3/32 |
| JP | 1-121103 | | | 5/1989 | |
| JP | 1-316102 | | | 12/1989 | |
| JP | 6-703 | | | 1/1994 | |
| JP | 7-185901 | | | 7/1995 | |
| JP | 8-126901 | | | 5/1996 | |
| JP | 10-501758 | | | 2/1998 | |
| WO | WO96/32224 | | | 10/1996 | |
| WO | WO0225388 | | * | 3/2002 | ............ B23B 7/02 |

* cited by examiner

Primary Examiner—Derris H. Banks
Assistant Examiner—Dana Ross
(74) Attorney, Agent, or Firm—Manabu Kanesaka

(57) ABSTRACT

An NC lathe performs various processing at the same time to a plurality of works. The NC lathe includes a first spindle and a second spindle, and a tool rest having tools for processing works. The tool rest is freely movable in the direction of Z1-axis and X1-axis. The second spindle is freely movable in the direction of X2-axis and Z2-axis. An NC unit controls the movement in the direction of the X1-axis and the Z1-axis of the tool rest, and controls the movement in the direction of the X2-axis and the Z2-axis of the second headstock. The NC unit superposes the movement in the direction of the X2-axis on the movement of the X1-axis of the tool rest. Furthermore, the movement of the Z2-axis is superposed on the movement in the direction of the Z1-axis of the tool rest.

10 Claims, 12 Drawing Sheets

NUMERICALLY CONTROLLED LATHE AND METHOD OF MACHINING WORK USING THIS NUMERICALLY CONTROLLED LATHE

TECHNICAL FIELD

The present invention relates to a numerical control lathe comprising two headstocks facing to each other, spindles respectively supported by these two headstocks, and a tool rest where a tool for processing a work held by each of the spindles is mounted, and a processing method of a work by this numerical control lathe.

BACKGROUND ART

A numerical control lathe (hereafter, referred to as a NC lathe) which comprises two headstocks facing to each other and a tool rest, and by which two works mounted to the spindles of the two headstocks can be processed at the same time is well known, for example, in Japanese Patent Application National Publication (Laid-Open) No. 10-501758 or the like.

FIG. 12 is a plan view explaining the rough structure of a NC lathe disclosed in Japanese Patent Application National Publication (Laid-Open) No. 10-501758.

On a bed 210 of an NC lathe 200, a first headstock 220 and a second headstock 230 are arranged facing to each other. The first headstock 220 and the second headstock 230 rotatably support spindles 221, 231 in parallel with the Z-axis of the NC lathe 200, respectively. These spindles 221, 231 are arranged so that the positions thereof are shifted in the direction of the X-axis. At the tip of each of the spindles 221, 231, a chuck (not shown in the figure) is provided, and by this chuck, works W1, W2 are held.

The first headstock 220 is fixed to a bed 210. To the bed 210, a guide rail 240 extending in the direction in parallel with the Z-axis of the NC lathe 200 is provided. On this guide rail 240, a saddle 250 is mounted, and this saddle 250 moves in the direction of the Z1-axis in parallel with the Z-axis while guided by the guide rail 240 by the driving of a driving body such as a servo motor (not shown in the figure).

On the saddle 250, a guide rail 270 is provided in the direction in parallel with the X-axis of the NC lathe 200. On this guide rail 270, a reciprocating rest 255 which performs reciprocating motion along the guide rail 270 is mounted. The second headstock 230 and a first tool rest 260 are mounted on this reciprocating rest 255. The second headstock 230 and the first tool rest 260 integrally move in the direction of the X1-axis in parallel with the X-axis while guided by the guide rail 270 by the driving of a driving body such as a servo motor (not shown in the figure).

The first tool rest 260 comprises a turret plate 261 in which dividing rotation is possible on one side. To this turret plate 261, a plurality of tools T1 for processing a work W1 held by the spindle 221 of the first headstock 220 are mounted. Then, the work W1 is processed while the tool T1 is positioned and moved relative to the work W1 by the combination of the movement in the direction of the Z1-axis of the saddle 250 and the movement in the direction of the X1-axis of the first tool rest 260.

Facing to a spindle 231 of the second headstock 230, a second tool rest 280 is provided. On one side of this second tool rest 280, a turret plate 281 in which dividing rotation is possible is provided. To this turret face pate 281, a plurality of tools T2 for processing a work W2 held by the spindle 231 of the second headstock 230 are mounted. The second tool rest 280 is freely movable in the direction of the X2-axis in parallel with the X-axis on the bed 210 along a guide rail 282 provided in the direction of the X2-axis in parallel with the X-axis of the NC lathe 200.

In the case of such a NC lathe 200, the first tool rest 260 and the second headstock 230 are provided on the common saddle 250 and reciprocating rest 255, and therefore, the feed in the direction of the Z1-axis of the tool T1 relative to the work W1 becomes the feed of the tool T2 relative to the work W2, and the same drilling processing or the like can be performed at the same time to two works W1, W2.

Furthermore, different processing can be performed to works W1, W2 at the same time by adding original feed speed in the direction of the X2-axis to the tool T2 while feeding the tool T2 in the direction of the X2-axis in synchronism with the feed in the direction of the X1-axis of the tool T1.

In the case of the NC lathe 200, the same or different processing can be performed at the same time to a plurality of works W1, W2, but there is the following problem.

That is, the feed speed in the direction of the Z-axis of the tool T1 is determined by the feed speed in the direction of the Z1-axis of the saddle 250, and therefore, the processing form of the works W1, W2 which can be processed at the same time is limited.

Furthermore, two tool rests 260, 280 are necessary for processing two works W1, W2, and the NC lathe 200 becomes complex and large-sized, and the cost is also raised.

The objects of the present invention are to provide an NC lathe where various processing can be performed at the same time to the work on the first spindle side and the work on the second spindle side, and a control method thereof, and to provide an NC lathe where various processing can be performed at least at one tool rest so that the structure is simplified, and a control method thereof.

DISCLOSURE OF THE INVENTION

The numerical control lathe of the present invention is a numerical control lathe comprising: a first headstock and a second headstock which are arranged facing to each other; a first spindle which is supported by the first headstock and a second spindle which is supported by the second headstock; a tool rest which has tools for processing works held by the first spindle and the second spindle; and a numerical control unit which controls the rotation of the first spindle, the rotation of the second spindle, and the relative movement of the tool rest to the first headstock or the second headstock, wherein the tool rest has a first tool for processing a work held by the first spindle and a second tool for processing a work held by the second spindle, and is freely movable in the direction of the Z1-axis in parallel with the spindle axial line of the first spindle and in the direction of the X1-axis at right angles thereto, and the second headstock is freely movable in the direction of the X2-axis and the direction of the Z2-axis in parallel with the X1-axis and the Z1-axis of the tool rest, and the numerical control unit is arranged to make it possible to superpose the movement in the direction of the X2-axis necessary for processing the work held by the second spindle by the second tool on the movement in the direction of the X1-axis, and to make it possible to superpose the movement in the direction of the Z2-axis necessary for processing the work held by the second spindle by the second tool on the movement in the direction of the Z1-axis.

The numerical control unit can also be arranged to comprise a first control system which controls the movement in the direction of the X1-axis and the movement in the direction of the Z1-axis of the tool rest and a second control system which controls the movement in the direction of the X2-axis and the movement in the direction of the Z2-axis of the second headstock.

According to this structure, the work of the first headstock is processed by the first tool while the tool rest moves in the direction of the X1-axis and the direction of the Z1-axis. The second headstock can move in the direction of the X2-axis and the directions of the Z2-axis which are the same directions as the tool rest, and therefore, by making the second headstock in synchronization with the movement of the tool rest, the relative speed of the second tool mounted on the tool rest to the work of the second headstock can be made zero.

Then, by superposing the movement in the direction of the X2-axis of the second headstock necessary for processing the work by the second tool on the movement in the direction of the X1-axis of the tool rest, and by superposing the movement in the direction of the Z2-axis of the second headstock necessary for processing the work by the second tool on the movement in the direction of the Z1-axis of the tool rest, the final movement of the second headstock can be determined.

By doing this, the processing of the work of the first spindle by the first tool and the processing of the work of the second spindle by the second tool can be done at the same time. Furthermore, this processing of works can be different in the work of the first spindle side and the work on the second spindle side.

It is preferable that the distance in the direction of the X-axis between the edge of the first tool and the edge of the second tool is larger than the maximum value of the movement distance in the direction of the X-axis when the work is processed by the first tool, and the edge position of the second tool is furthermore separated from the tool rest than the edge position of the first tool, and that the distance in the direction of the Z-axis between the edge of the first tool and the edge of the second tool is larger than the sum of the maximum value of the movement distance in the direction of the Z-axis when the work is processed by the first tool and the maximum value of the movement distance in the direction of the Z-axis when the work is processed by the second tool, and that the distances in the direction of the X-axis and the direction of the Z-axis between the processing original point of the work on the first spindle side and the processing original point of the work on the second spindle side are corresponding to the distances between the edges of the first tool and the second tool.

By doing this, the miniaturization of the headstock for preventing the interference can be restrained to the minimum, and the occurrence of the insufficiency of output, the unevenness of rotation, or the pulsation of the spindle can be prevented, and it is unnecessary to decrease the maximum diameter of the work which can be processed. Furthermore, it is unnecessary to make a large recess 167 of the tool rest, and therefore, the mechanical rigidity of the tool rest 160 can be kept high, and it can also be prevented to cause the vibration of the tool or the fluctuation of the edge position during the processing and lower the processing accuracy.

Furthermore, the tool rest can be prevented from interfering with the second headstock and the work held by the first spindle can be prevented from interfering with the work held by the second spindle, even if the second headstock is moved following the tool rest and furthermore, the movement of the second headstock is superposed on the movement of the tool rest for processing the work held by the second spindle.

Furthermore, the processing method of a work by a numerical control lathe of the present invention is a processing method of a work in the numerical control lathe comprising: a first headstock and a second headstock which are arranged facing to each other; a first spindle which is supported by the first headstock and a second spindle which is supported by the second headstock; and a tool rest which has tools for processing works held by the first spindle and the second spindle, wherein to the tool rest, a first tool for processing a work held by the first spindle and a second tool for processing a work held by the second spindle are mounted, and the tool rest is moved in the direction of the Z1-axis in parallel with the spindle axial line of the first spindle and in the direction of the X1-axis at right angles thereto, and the second headstock is movable in the direction of the X2-axis in parallel with the X1-axis of the tool rest and the direction of the Z2-axis in parallel with the Z1-axis, and the movement in the direction of the X2-axis of the second headstock necessary for processing of the work by the second tool is superposed on the movement in the direction of the X1-axis, and the movement in the direction of the Z2-axis of the second headstock necessary for processing of the work by the second tool is superposed on the movement in the direction of the Z1-axis, and the second headstock is moved in the direction of the X2-axis and the direction of the Z2-axis, and the processing of the work of the first spindle by the first tool and the processing of the work of the second spindle by the second tool are performed at the same time.

According to this method, the movement in the direction of the X2-axis of the second headstock necessary for processing of the work by the second tool can be superposed on the movement in the direction of the X1-axis of the tool rest, and the movement in the direction of the Z2-axis of the second headstock necessary for processing of the work by the second tool can be superposed on the movement in the direction of the X1-axis of the tool rest, and the processing of the work of the first spindle by the first tool and the processing of the work of the second spindle by the second tool can be performed at the same time.

It is preferable that among the set of the X1-axis and the X2-axis and the set of the Z1-axis and the Z2-axis which are superposed, the position of the axes of any one set is positioned at the previously set first position to perform the superposition of the one set, and in the state where the axes of the one set whose superposition is completed are positioned at the first position, the position of the axes of the other set is positioned at the previously set second position to perform the superposition of the other set.

By doing this, there is such an advantage that the programmer who prepares the processing program can easily grasp the positional relation between the tool and the work. Furthermore, there is such an advantage that by superposing the X2-axis only at the processing area of the X1-axis and the periphery thereof, a short stroke is sufficient for the X1-axis with a long stroke including the stroke for the turnout at the time of tool exchanging of the tool rest or the like, and the miniaturization of the NC lathe can be achieved.

It is more preferable that the procedure for performing the superposition of the set of the X1-axis and the X2-axis or the superposition of the set of the Z1-axis and the Z2-axis is defined in advance, and the procedure is executed to perform the superposition when a command of performing the superposition of the set of the X1-axis and the X2-axis or the superposition of the set of the Z1-axis and the Z2-axis is inputted.

By doing this, the simplifying of the processing program can be achieved.

BRIEF DESCRIPTION OF THE DRAWINGS

FIGS. 5(a) and 5(b) are explanatory figures of the operation of the NC lathe of the present invention, wherein FIG. 5(a) is a rough drawing showing the initial state before the processing start, and FIG. 5(b) is a rough drawing showing the state where works mounted on two spindles are processed at the same time;

BEST MODE FOR CARRYING OUT THE INVENTION

The preferred embodiments of the present invention will be described below in detail while referring to drawings.

First, according to FIG. 1 and FIG. 2, the rough structure of the NC lather of the present invention will be described.

Figure 1:
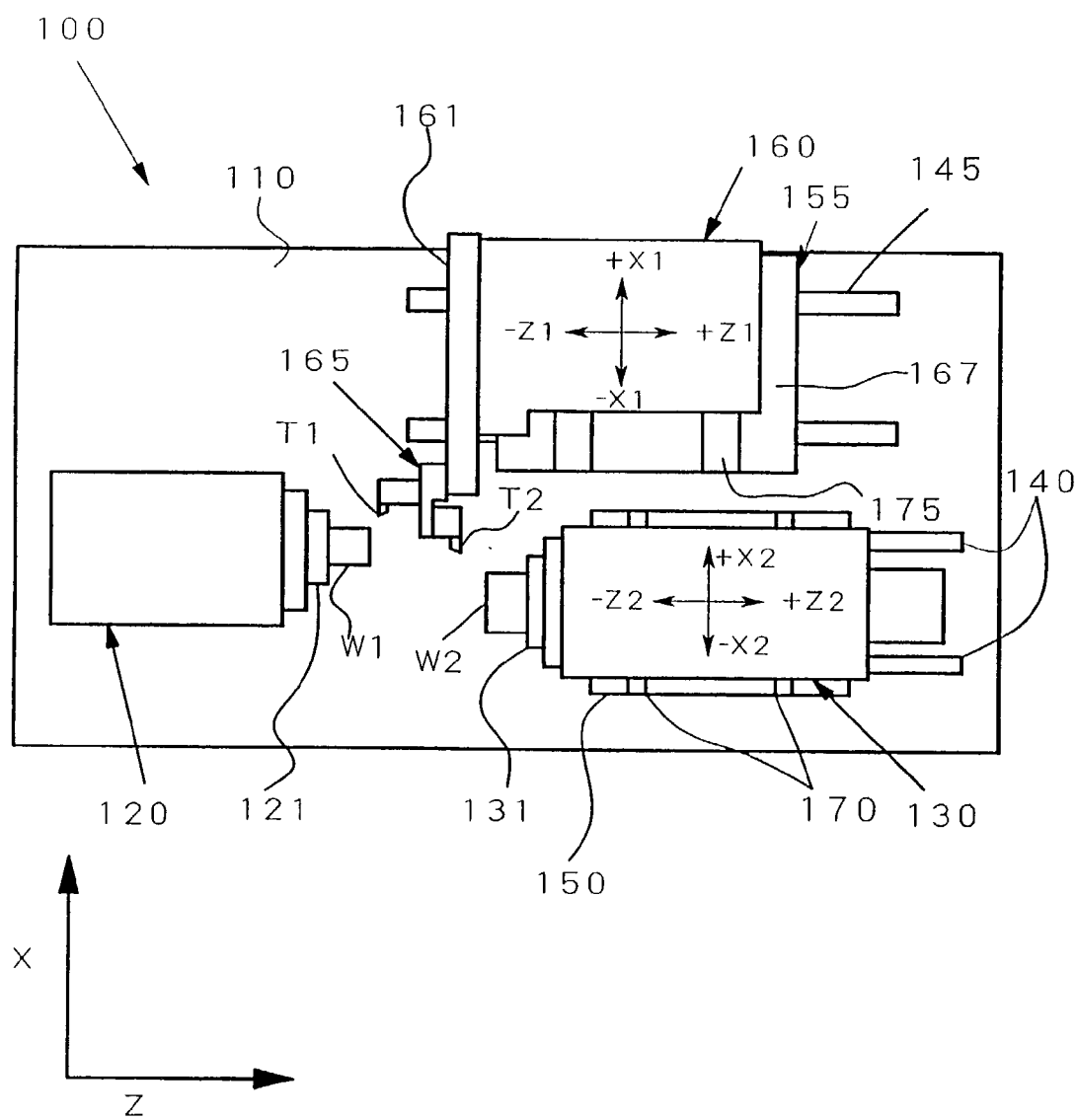
FIG. 1 is a plan view explaining the rough structure of an NC lathe of the present invention.
Figure 2:
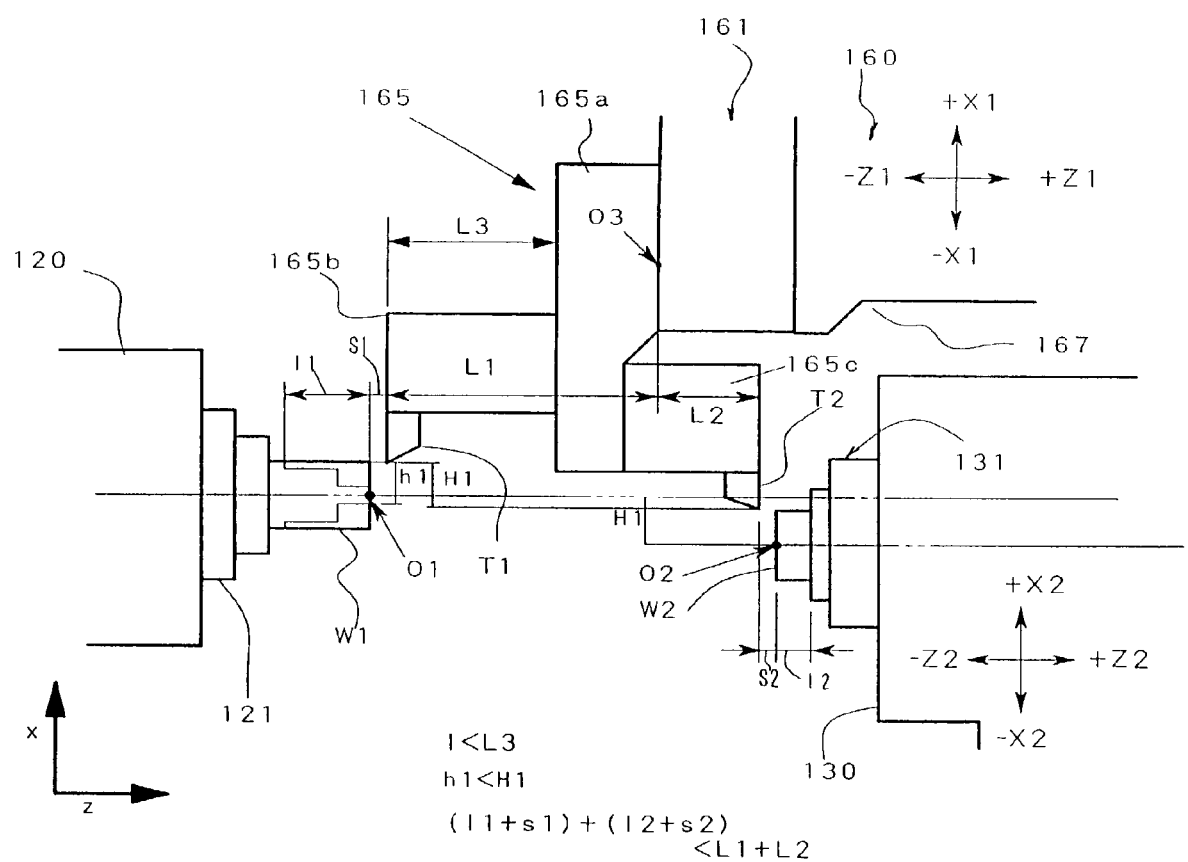
FIG. 2 is a figure explaining the positional relationship between tools of a tool rest and works mounted on two spindles facing to each other in the NC lathe in FIG. 1.

FIG. 1 relates to a first embodiment of the NC lathe of the present invention, and is a plan view explaining the rough structure thereof, and FIG. 2 is a partial expanded figure of FIG. 1, which explains the positional relation between a tool rest and two headstocks facing to each other.

To a bed 110 of the NC lathe 100, a first headstock 120 and a second headstock 130 are arranged facing to each other. The first headstock 120 rotatably supports a first spindle 121, and the second headstock 130 rotatably supports a second spindle 131. At the tips of the first spindle 121 and the second spindle 131, chucks (not shown in the figure) are provided, respectively, and it is arranged that works W1, W2 can be held by these chucks.

In this embodiment, the first headstock 120 is fixed to the bed 110. To the bed 110, a guide rail 140 is provided in the direction in parallel with the Z-axis. To this guide rail 140, a saddle 150 is mounted. This saddle 150 moves in the direction of the Z2-axis in parallel with the Z-axis while guided by the guide rail 140 by the driving of a motor (not shown in the figure) which is a driving body.

On the saddle 150, a guide rail 170 is provided in the direction in parallel with the X-axis at right angles to the Z-axis. The second headstock 130 is mounted on this guide rail 170, and moves in the direction of the X2-axis in parallel with the X-axis while guided by the guide rail 170 by the driving of a driving body (not shown in the figure).

To the bed 110, a guide rail 145 is provided in parallel with the guide rail 140. To this guide rail 145, a saddle 155 is mounted. This saddle 155 moves in the direction of the Z1-axis in parallel with the Z-axis while guided by the guide rail 145 by a servo motor (not shown in the figure) which is a driving body.

On the upper surface of the saddle 155, a guide rail 175 is provided in the direction in parallel with the X-axis. A tool rest 160 is mounted on this guide rail 175, and moves in the direction of the X1-axis while guided by the guide rail 175 by the driving of a servo motor (not shown in the figure) which is a driving body.

The tool rest 160 has a turret plate 161 in which dividing rotation is possible on one side. To this turret plate 161, a plurality of tools T1 for processing the work W1 held by the first spindle 121 are mounted. By the movement in the direction of the X1-axis of the tool rest 160 and the movement in the direction of the Z1-axis of the saddle 155, the tool T1 is positioned at a specified position relative to the work W1, and in the meantime, it processes the work W1 while moving relative to the work W1.

Furthermore, to the turret plate 161, at the same position (the same station) as the mounting position of the tool T1 which is the first tool, a tool T2 which is the second tool for processing the work W2 held by the second spindle 131 is mounted. The tool T2 is positioned relative to the work W2 and in the meantime, it moves to process the work W2, by the feeding in the direction of the X2-axis of the second headstock 130 where the feed speed in the direction of the X-axis for processing the work W2 is superposed on the feed speed in the direction of the X1-axis of the tool rest 160, and the feeding in the direction of the Z2-axis of the second headstock 130 where the feed speed in the direction of the Z-axis for processing the work W2 is superposed on the feed speed in the direction of the Z1-axis of the tool rest 160.

In FIG. 2, an expanded figure of the main part of the tool rest 160 is shown.

The tool T1 and the tool T2 are mounted on the turret plate 161 through a tool holder 165. The tool holder 165 comprises a holder main body 165a fixed to the turret plate 161 by a bolt or the like, a holder 165b attached to the surface on the first headstock 120 side of this holder main body 165a, and a holder 165c attached to the surface on the second headstock 130 side of the holder main body 165a. Then, the tool T1 is mounted on the holder 165b, and the tool T2 is mounted on the holder 165c.

In the holder 165b and the holder 165c, the size of each part is determined so that one work (for example, the work W1) does not interfere with the other work (for example, the work W2), the other tool (for example, the tool T2), a holder (for example, the holder 165c), or the holder main body 165a when the processing of the work W1 by the tool T1 and the processing of the work W2 by the tool T2 are performed at the same time.

In the case of the tool holder 165 shown in FIG. 2, the distance L3 in the direction of the Z-axis from the edge of the tool T1 to the surface of the holder main body 165a is determined to be larger than the processing length l1 of the work W1. Furthermore, to the tool rest 160, a recess 167 is formed so that the stroke in the direction of the X1-axis of the tool rest 160 and the stroke in the direction of the X2-axis of the second headstock 130 can be made larger as much as possible without interference of the second headstock 130 and the tool rest 160.

It is preferable that in the positional relation between the tool T1 and the tool T2, the tip of the tool T2 is positioned at a position furthermore separated from the tool rest 160 than the tip of the tool T1, as shown in the figure.

It is more preferable that the distance H1 in the direction of the X-axis between the edges of the tool T1 and the tool T2 is larger than the maximum run-in amount h1 in the direction of the X1-axis when the tool T1 processes the work W1.

It becomes unnecessary to increase the clearance of the recess 167 of the tool rest 160, with the amount of the distance in the direction of the X-axis between the edges of these tool T1 and tool T2, and it is possible to increase the width on the tool rest 160 side of the second headstock 130 to keep the rigidity of the second headstock 130 high. Furthermore, in the case of the tool rest 160, the rigidity receives effects by the clearance of the recess 167, and therefore, with such a distance in the direction of the X-axis between the edges of the tool T1 and the tool T2, the rigidity of the tool rest 160 can also be kept high.

When doing this, it is unnecessary to make the second headstock 130 small-sized or to enlarge the recess 167 of the tool rest 160, and the miniaturization of the NC lathe can be achieved.

It is preferable that the distance L1+L2 in the direction of the Z-axis between the edges of the tool T1 and the tool T2 is larger than the distance found by adding the maximum amount of movement l1+s1 in the direction of the Z1-axis when the tool T1 processes the work W1 and the maximum amount of movement l2+s2 in the direction of the Z2-axis when the tool T2 processes the work W2.

When doing this, the interference of the work W1 and the work W2 to be subjected to the superposition processing can be prevented.

In the case of the NC lathe with this structure, such a processing method where after the finish of the processing on the front side of the work W1 held by the first spindle 121, the work W1 is delivered to the second spindle 131, and the back side is processed, is often used. Therefore, it is necessary to make the axial line of the second spindle 131 agree with the axial line of the first spindle 121, and the stroke in the direction of the X-axis of the second spindle 131 going to the tool rest 160 should be kept at least up to the position where the concentricity with the axial line of the first spindle 121 can be achieved.

[Explanation of Control Unit]

Figure 3:
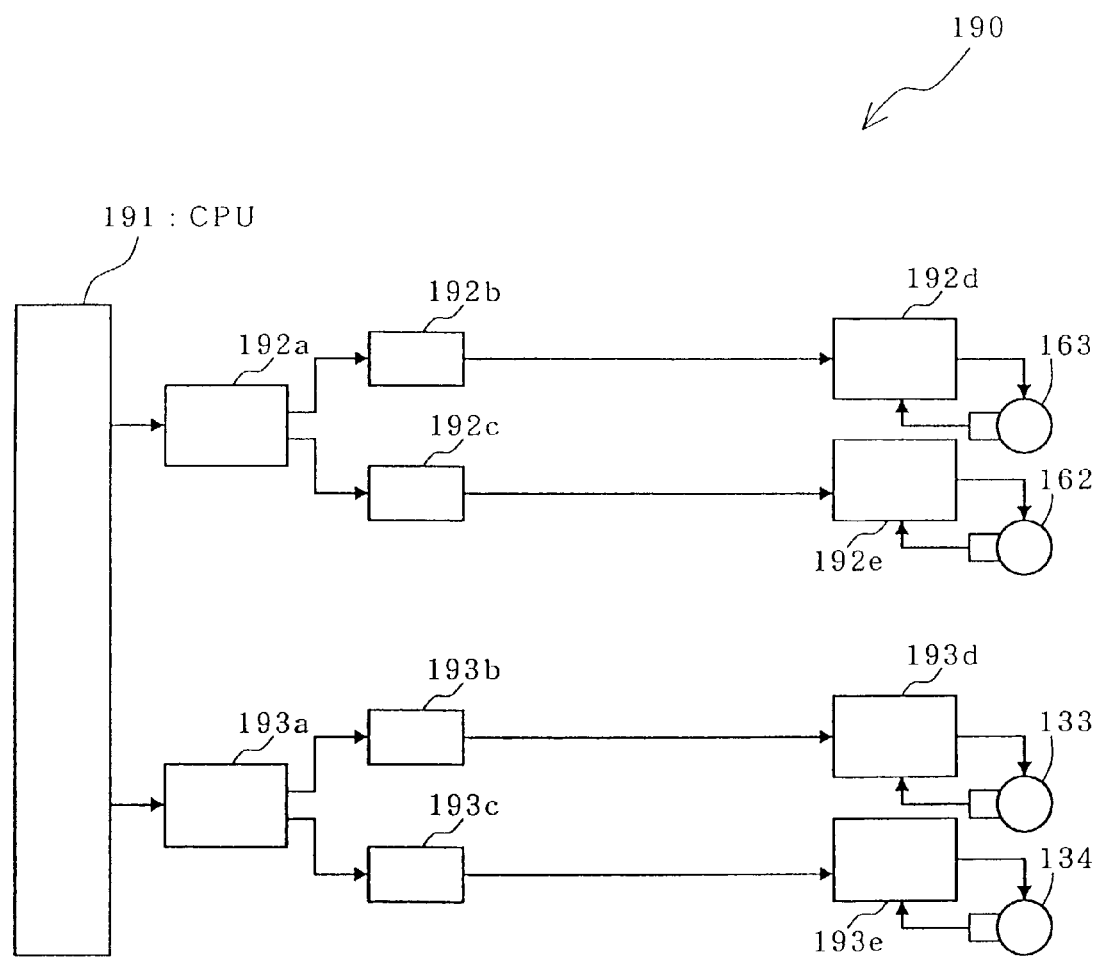
FIG. 3 is a control block diagram of a control unit of the numerical control lathe of the present invention.

FIG. 3 is a control block diagram of the control unit in this NC lathe 100.

A control unit 190 comprises a central processing unit (CPU) 191, a first arithmetic processor circuit 192a which controls the movement in the direction of the Z1-axis and the direction of the X1-axis of the tool rest 160 by the command from this CPU 191, speed processor circuits 192b, 192c which output speed signals in the direction of the X1-axis and the direction of the Z1-axis on the basis of the output signal from this first arithmetic processor circuit 192a, and servo processor circuits 192d, 192e which drive servo motors 163, 162 so that the tool rest 160 is moved at a specified speed in the direction of the X1-axis and the direction of the Z1-axis on the basis of output signals from these speed processor circuits 192b, 192c.

Similarly, it comprises a second arithmetic processor circuit 193a which controls the movement in the direction of the Z2-axis and the direction of the X2-axis of the second headstock 130 by the command from the CPU 191, speed processor circuits 193b, 193c which output speed signals in the direction of the X2-axis and the direction of the Z2-axis on the basis of the output signal from this second arithmetic processor circuit 193a, and servo processor circuits 193d, 193e which drive servo motors 133, 134 so that the second headstock 130 is moved at a specified speed in the direction of the X2-axis and the direction of the Z2-axis on the basis of output signals from these speed processor circuits 193b, 193c.

The CPU 191 adds the movement command in the direction of the Z-axis and the direction of the X-axis necessary for processing the work W2 to the movement command in the direction of the Z1-axis and the direction of the X1-axis, and performs the movement command in the direction of the Z2-axis and the direction of the X2-axis, and superposes the movement speed of the second headstock 130 on the movement of the tool rest 160.

The superposition is also possible by the control unit with another structure.

Figure 4:
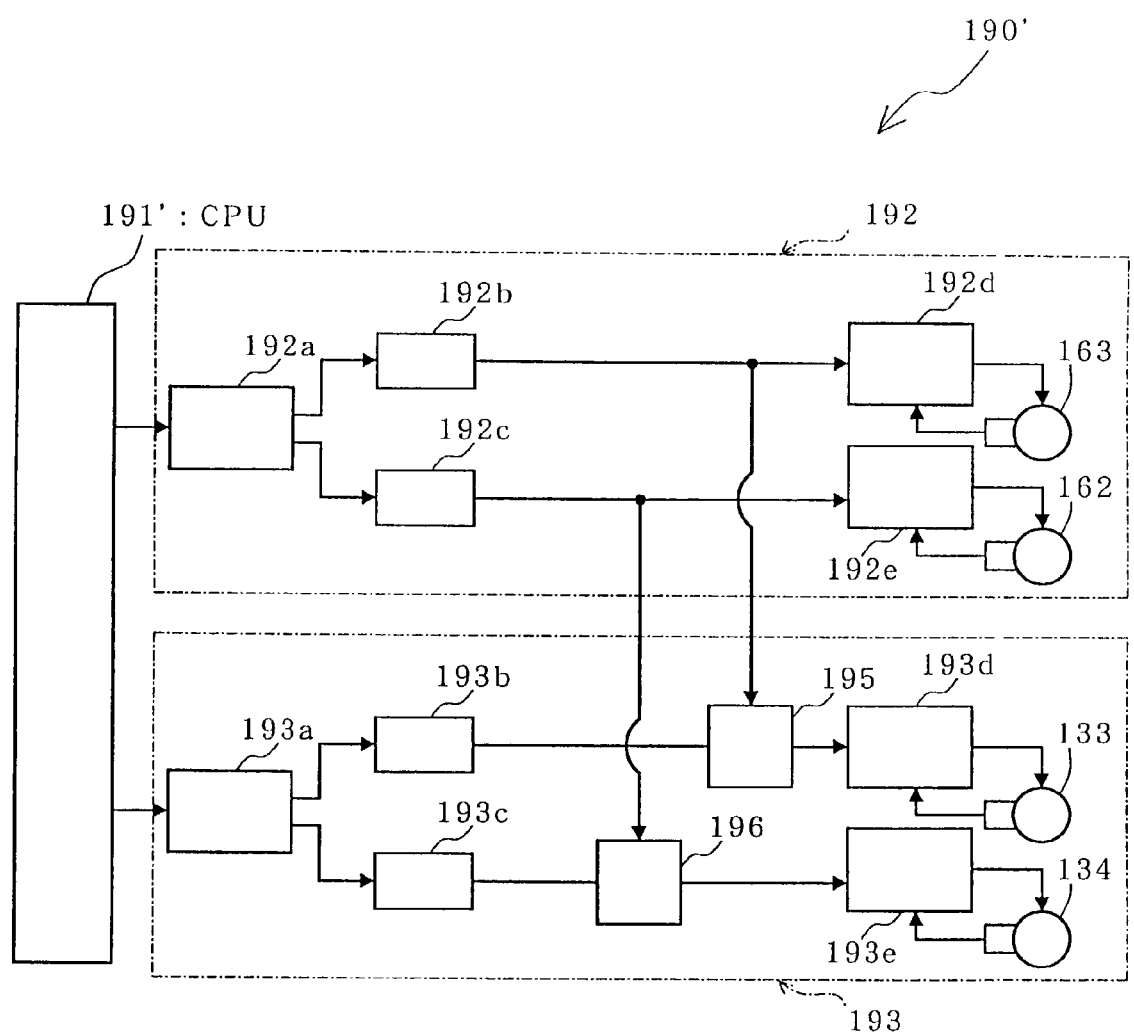
FIG. 4 relates to another example of a control unit of the numerical control lathe of the present invention, and is a control block diagram thereof.

FIG. 4 relates to another embodiment of a control unit in this NC lathe 100, and is a control block diagram thereof.

In FIG. 4, the same marks are given to the same parts as those of the control unit in FIG. 3, and the detailed description will be omitted.

The control unit 190' comprises a central processing unit (CPU) 191', a first control system 192 which controls the movement in the direction of the Z1-axis and the direction of the X1-axis of the tool rest 160 by the command from this CPU 191', and a second control system 193 which controls the movement in the direction of the Z2-axis and the direction of the X2-axis of the second headstock 130 by the command from the CPU 191.

The first control system 192 comprises a first arithmetic processor circuit 192a, speed processor circuits 192b, 192c, and servo processor circuits 192d, 192e.

Similarly, the second control system 193 comprises a first arithmetic processor circuit 193a, speed processor circuits 193b, 193c, and servo processor circuits 193d, 193e.

To the second control system 193, between the speed processor circuits 193b, 193c and the servo processor circuits 193d, 193e, superposition circuits 195, 196 are furthermore provided.

The superposition circuit 195 adds the feed command (relative feed command of the work W2 and the tool T2) in the direction of the X2-axis of the second headstock 130 for processing the work W2 by the tool T2 to the feed command in the direction of the X1-axis of the tool rest 160, and outputs the result thereof to the servo processor circuit 193d as a feed command in the direction of the X2-axis of the second headstock 130.

The superposition circuit 196 adds the feed command (relative feed command of the work W2 and the tool T2) in the direction of the Z1-axis of the second headstock 130 for processing the work W2 by the tool T2 to the feed command in the direction of the Z1-axis of the tool rest 160, and outputs the result thereof to the servo processor circuit 193e as a feed command in the direction of the Z2-axis of the second headstock 130.

According to the control unit 190', the feed command in the direction of the X1-axis and the direction of the Z1-axis of the tool T1 for processing the work W1 is outputted to the first control system 192 from the CPU 191', and the feed command (relative movement command of the work W2 and the tool T2) in the direction of the X1-axis and the direction of the Z1-axis of the tool T2 for processing the work W2 is outputted to the second control system 193 from the CPU 191.

The first control system 192 moves the tool T1 together with the tool rest 160 on the basis of the output from the CPU 191'. The second control system 193 adds the feed command of the tool rest 160 to the feed command from the CPU 191', and superposes the movement speed, and moves the second headstock 130.

Next, the operation of the NC lathe 100 with the structure will be described while referring to FIG. 1 to FIG. 5(*b*).

Figure 5A:
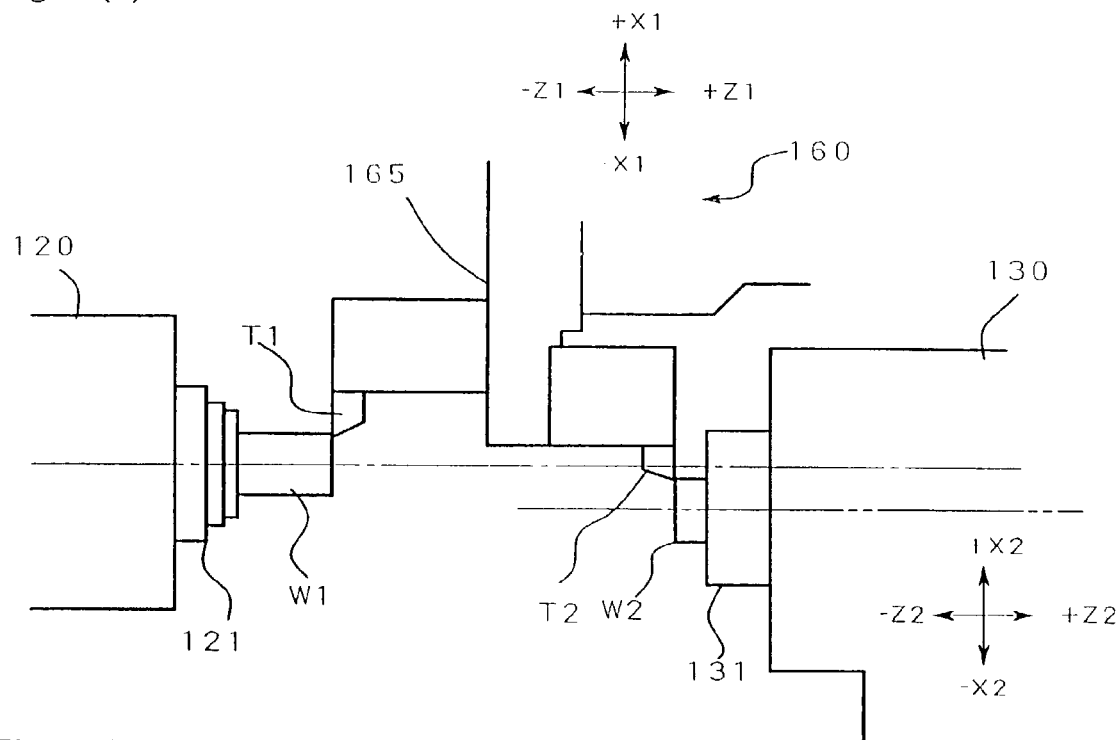
Figure 5B:
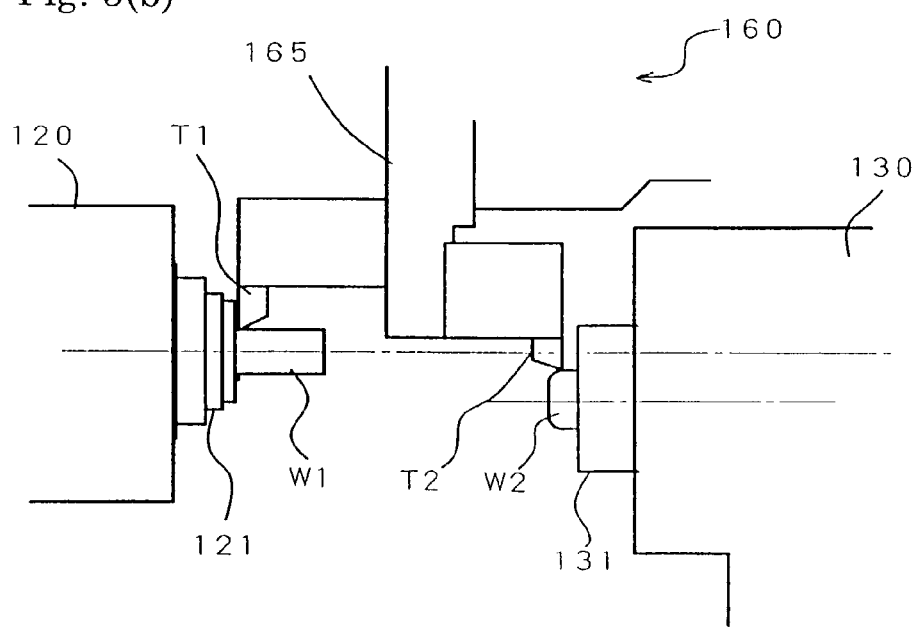

FIG. 5(*a*) is a figure showing the positional relation between each tool and each work in the initial state before the processing start, and FIG. 5(*b*) is a figure showing the positional relation between each tool and each work during the processing.

As shown in FIG. 2, in the waiting state, the tool rest 160 is positioned at a position separated from the first headstock 120 and the second headstock 130, so that the tools T1, T2 do not interfere with the works W1, W2 at the time of dividing rotation of the turret plate 161.

Furthermore, the first headstock 120 and the second headstock 130 are positioned so that the processing original point O1 of the work W1 and the processing original point O2 of the work W2 are positioned at specified positions. In this embodiment, the position of the second headstock 130 is determined, so that the processing original point O2 of the work W2 is positioned at a position furthermore separated from the tool rest 160 than the processing original point O1 of the work W1 (which exists on the spindle axial line of the first spindle 121).

When the tool rest 160 moves in the direction of the X1-axis and the direction of the Z1-axis from the waiting position in FIG. 2 in order to process the work W1 by the tool T1, and comes to the initial position shown in FIG. 5(*a*), the movement command equal to the feed speed in the direction of the X1-axis of the tool rest 160 and the feed speed in the direction of the Z1-axis is outputted to the second control system 193 from the first control system 192. This movement command makes it possible for the second headstock 130 to move at a speed equal to the feed speed of the tool rest 160 and in the direction equal to the movement direction of the tool rest 160. Consequently, when the tool rest 160 moves for processing the work W1 by the tool T1, the positional relation between the tool T2 and the work W2 can be kept constant.

In the superposition circuit 195, the movement command (relative movement command of the tool T2 and the work W2) in the direction of the X1-axis of the work W2 to the tool T2 when processing the work W2 by the tool T2 is added to the feed command in the direction of the X1-axis of the tool rest 160. Furthermore, in the superposition circuit 196, the movement command (relative movement command of the tool T2 and the work W2) in the direction of the Z1-axis of the work W2 to the tool T2 is added to the movement command in the direction of the Z1-axis of the tool rest 160. Then, the result thereof is outputted to the motor 133 and the motor 134.

Accordingly, as shown in FIG. 5(*b*), the processing which is entirely different from the processing of the work W1 can be performed to the work W2 by the tool T2 while performing the processing of work W1 by the tool T1.

In the processing example shown in FIG. 2 and FIGS. 5(*a*) and 5(*b*), both the tool T1 which is the first tool and the tool T2 which is the second tool are cutting bites.

According to the present invention, a processing other than cutting can be applied to the work W1 or the work W2, by using a tool other than the cutting bite as the first tool or the second tool.

Another Processing Example

Another processing example using the NC lathe of the present invention will be described below.

Figure 6A:
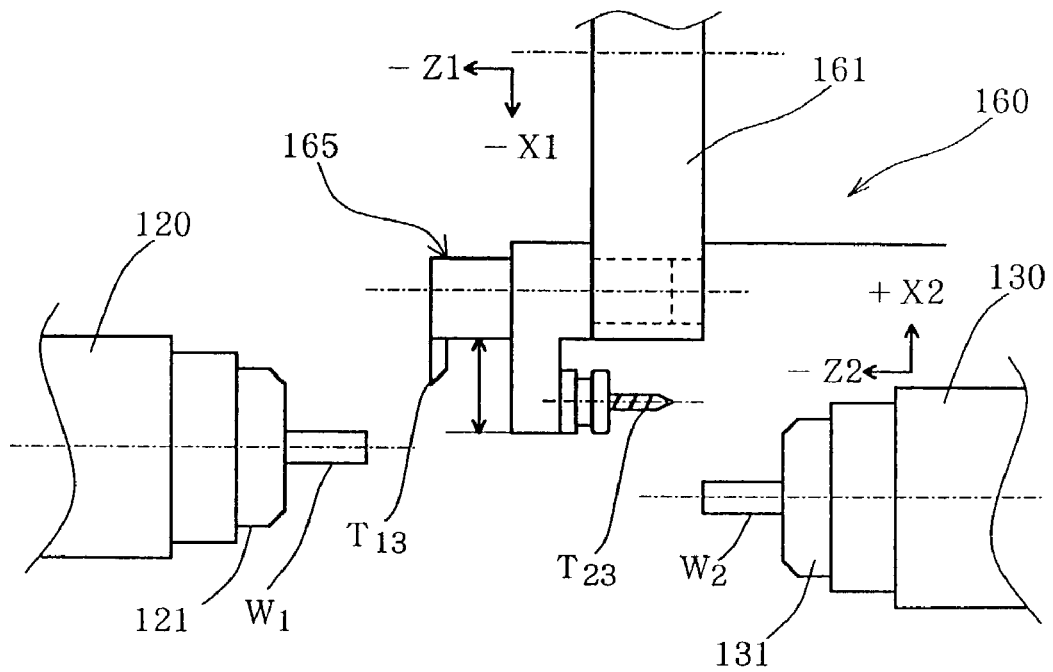
FIGS. 6(a) and 6(b) are figures showing furthermore another example of the processing form of works by the numerical control lathe of the present invention.
Figure 6B:
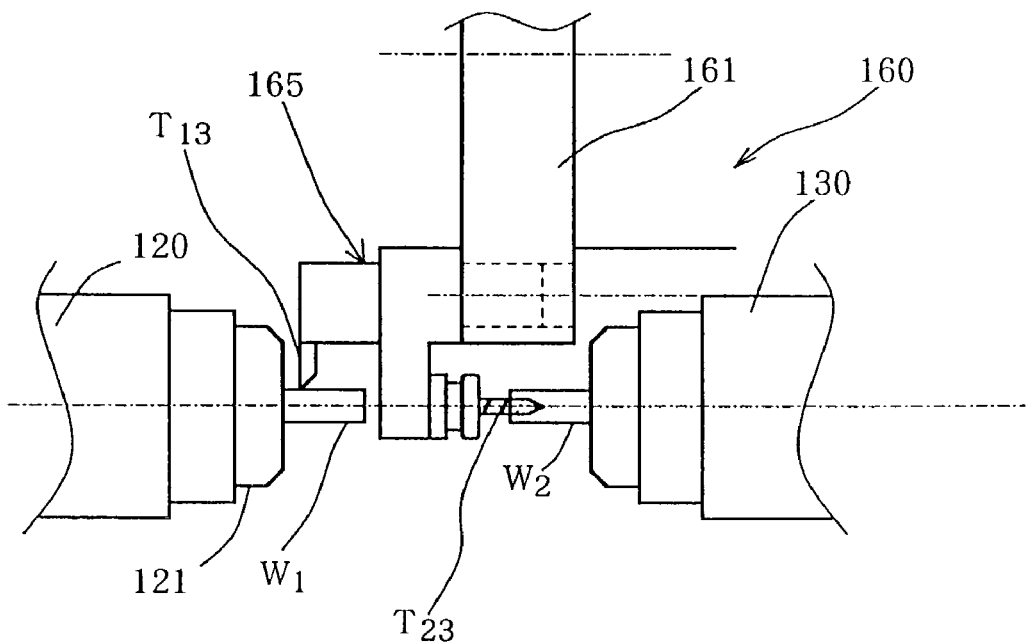

In the processing example shown in FIGS. 6(*a*) and 6(*b*), the cutting processing of the peripheral surface is applied to the work W1 by a bite T13, and the drilling processing is applied to the end surface of the work W2 by a drill T23.

In this case, it is necessary to superpose the feeds in the direction of the Z2-axis and the direction of the X2-axis of the second headstock 130 corresponding to the cut amount and the feed amount of the bite T13.

When performing the processing, the bite T13 is moved to the peripheral surface of the work W1, and the tool rest 160 is fed in the direction of the Z1-axis and the direction of the X1-axis to cut the peripheral surface of the work W1. At the same time, the second headstock 130 is fed in the direction of the Z2-axis and the direction of the X2-axis at a speed found by superposing the feed speed in the direction of the Z1-axis for processing the work W2 by the drill T23 on the feed speed in the direction of the Z1-axis of the tool rest 160, and a speed found by superposing the feed speed in the direction of the X2-axis on the feed speed in the direction of the X1-axis, and the drilling processing is applied to the end surface of the work W2.

Second Embodiment

In the case of the second embodiment to be described below, the superposition of the Z0-axis and the Z1-axis is added besides the superposition of the X1-axis and the X2-axis, and the Z1-axis and the Z2-axis.

Figure 7:
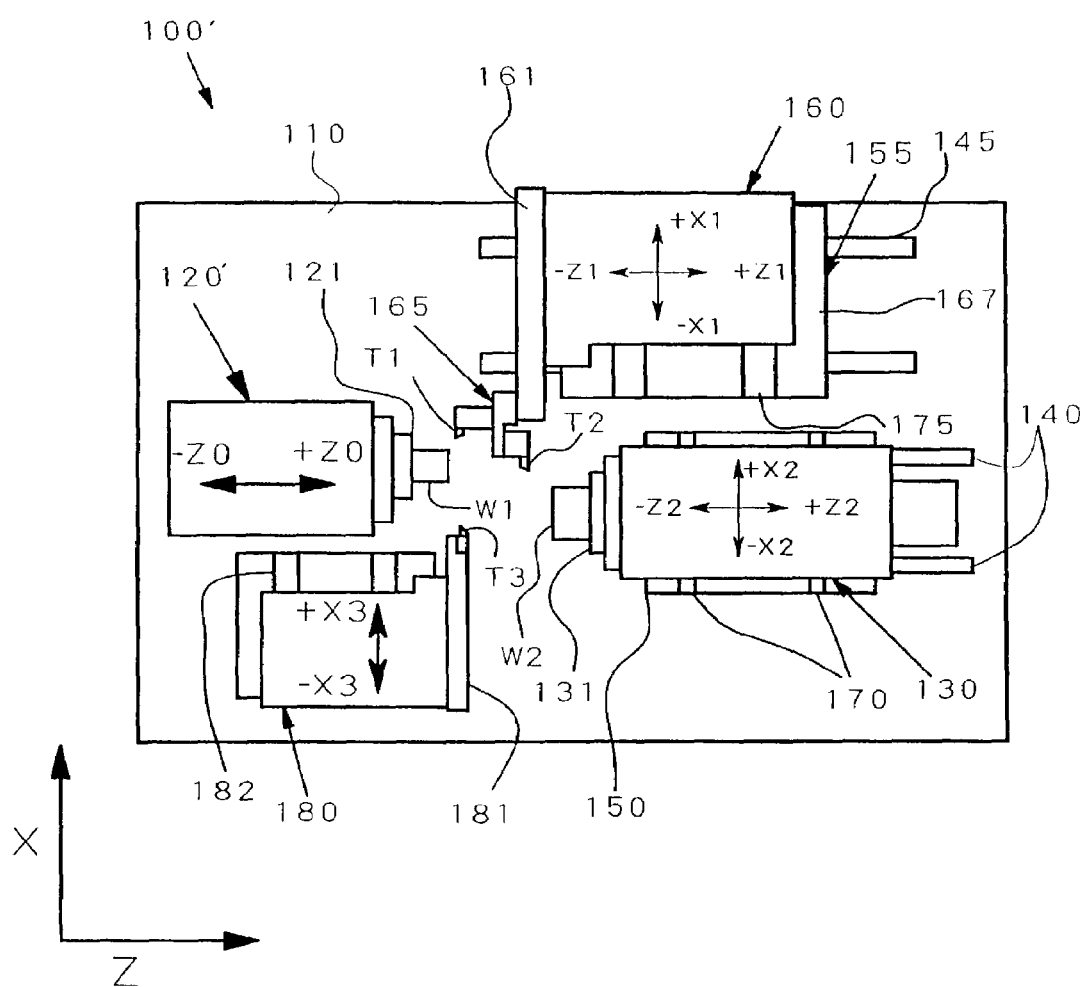
FIG. 7 is a plan view explaining the rough structure of the NC lathe according to a second embodiment of the present invention.
Figure 8:
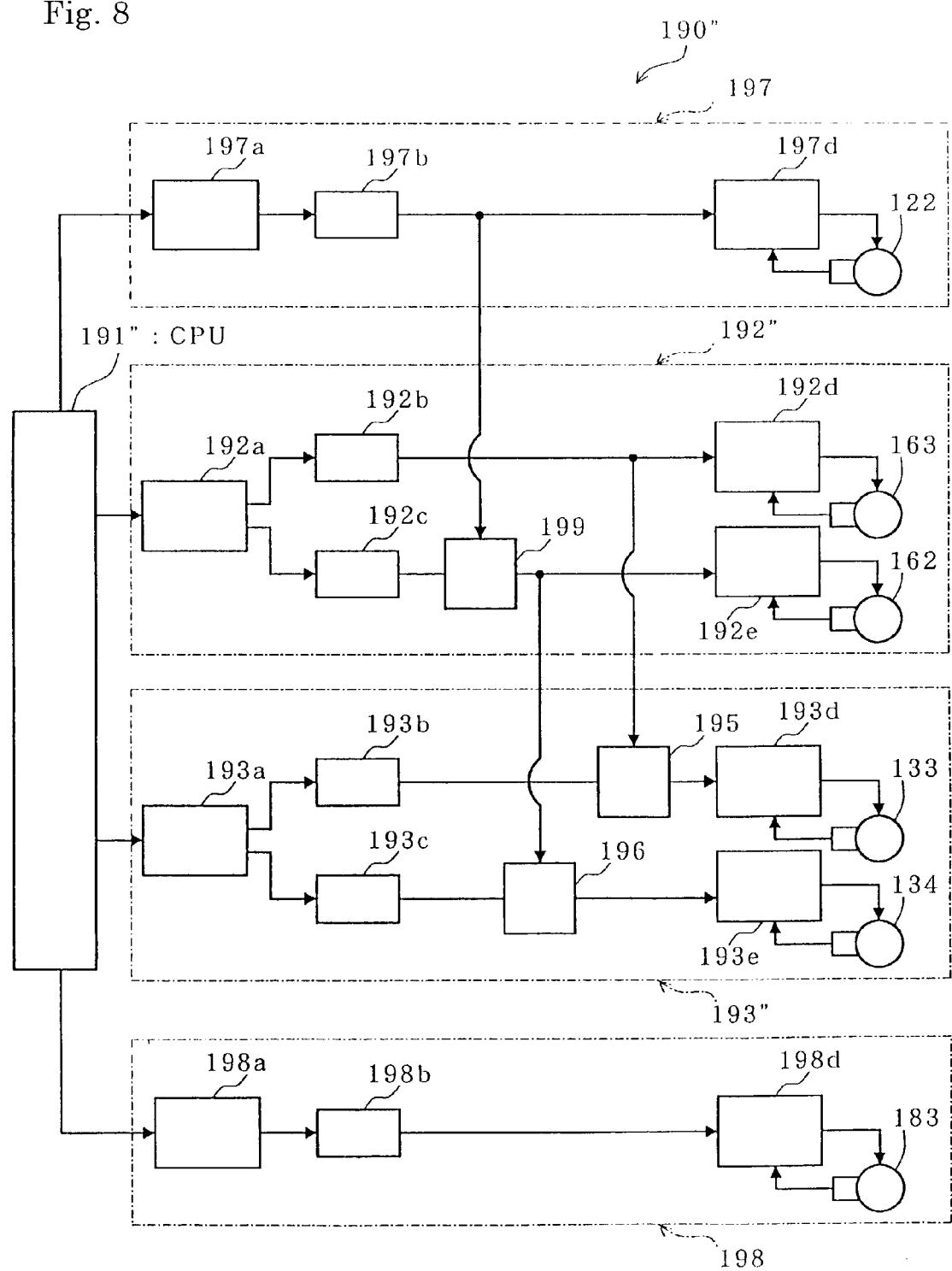
FIG. 8 is a control block diagram of the control unit in the NC lathe in FIG. 7.

In FIG. 7, a plan view explaining the rough structure of the NC lathe according to the second embodiment of the present invention is shown, and in FIG. 8, a control block diagram of the control unit in this NC lathe is shown.

Furthermore, In FIG. 7 and FIG. 8, the same marks as those in FIG. 1 and FIG. 3 are given to the same parts and the same members as those in the first embodiment, and the detailed description of the parts and members will be omitted.

The first headstock 120' of the NC lathe 100' of the second embodiment is freely movable in the direction of the Z0-axis in parallel with the Z-axis. The movement in the direction of the Z0-axis of the first headstock 120' is performed by the driving of a motor (not shown in the figure) which is the driving body.

A second tool rest 180 is provided facing to the tool rest 160. This second tool rest 180 is freely movable in the direction of the X3-axis in parallel with the X-axis along a guide rail 182 provided on a bed 110. The second tool rest 180 is moved in the direction of the X3-axis by the driving of a motor (not shown in the figure) which is the driving body.

On a turret plate 181 of the second tool rest 180, a third tool T3 for processing the work W1 is mounted. The tool T3 is positioned and moved to process the work W1 by the movement in the direction of the X3-axis of the second tool rest 180 and the movement in the direction of the Z0-axis of the first headstock 120'.

A control unit 190" of this NC lathe 100' further comprises a third control system 197 for moving the first headstock 120' in the direction of the Z0-axis and a fourth control system 198 for moving the second tool rest 180 in the direction of the X3.

The third control system 197 and the fourth control system 198 comprise first arithmetic processor circuits 197a, 198a, speed processor circuits 197b, 198b, and servo processor circuits 197d, 198d, respectively.

To the first control system 192" of this embodiment, between the speed processor circuit 192c in the direction of the Z1-axis and the servo processor circuit 192e in the direction of the Z1-axis, a superposition circuit 199 is provided. Then, into this superposition circuit 199, the feed speed in the direction of the Z0-axis outputted from the speed processor circuit 197b of the third control system 197 is inputted, and furthermore, the feed speed in the direction of the Z1-axis direction outputted from the superposition circuit 199 is inputted into the superposition circuit 196.

Consequently, the feed speed in the direction of the Z1-axis of the tool rest 160 is superposed on the feed speed in the direction of the Z0-axis of the first headstock 120', and the feed speed in the direction of the Z1-axis of the tool rest 160 and the feed speed in the direction of the Z2-axis of the second headstock 130 are superposed on the feed speed in the direction of the Z0-axis of the headstock 120'.

According to the above description, three sets of superposition of the Z0-axis and the Z1-axis, the Z1-axis and the Z2-axis, and the X1-axis and the X2-axis are performed, and different processing can be applied to the work W1 and the work W2 by the three tools T1, T2, T3.

In the above description, only the superposition of the speed has been mentioned, but the movement of the second headstock 130, the tool rest 160, the second tool rest 180, or the like is controlled by the position, the speed, and the acceleration. Accordingly, the superposition is also similarly performed as for the position and the acceleration in order to superpose the movements thereof.

[Procedure of Superposition]

In the case of the NC lathe of the present invention, the superposition is performed according to a specified procedure. The procedure will be described below while referring to FIG. 1 to FIG. 3 and FIG. 9 to FIG. 11.

Figure 9:
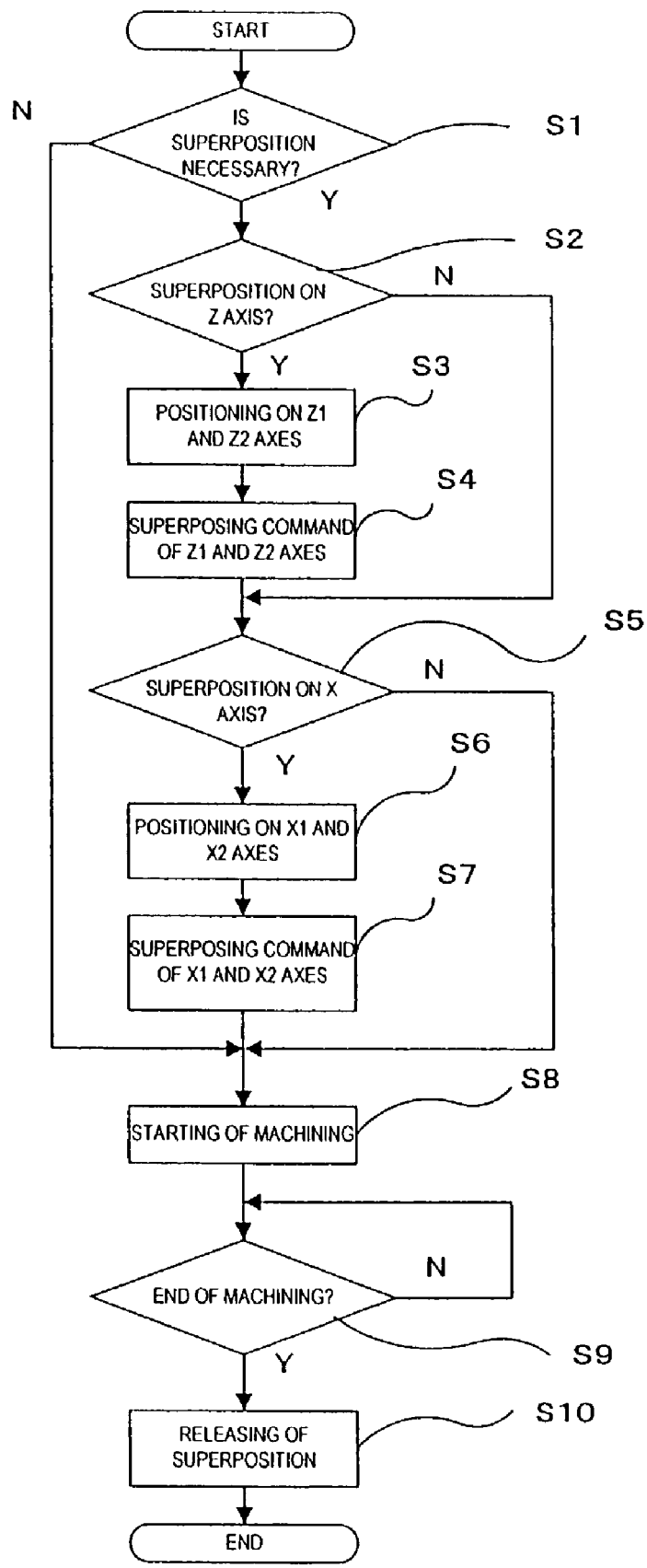
FIG. 9 is a flow chart for explaining the processing method of the present invention.

FIG. 9 is a flow chart explaining the procedure of the control in the NC lathe of the present invention, and the processing method.

The CPU 191 judges whether there is a need for superposition or not from among the NC processing programs for processing the Work W1 and the work W2 (step S1). In the case where there is no need for superposition, the processing of the work W1 by the tool T1 and the processing of the work W2 by the tool T2 are performed in order according to the NC processing program (step S8).

In the case where there is a need for superposition, whether the axis to be superposed is the Z-axis or the X-axis is judged (step S2 and step S5).

In the case where the axis to be superposed is the Z-axis (Z1-axis and Z2-axis), the superposition of the Z1-axis and the Z2-axis is performed (step S5) after performing the positioning of the Z1-axis and the Z2-axis (step S4).

In the case where the axis to be superposed is the X-axis (X1-axis and X2-axis), the superposition of the X1-axis and the X2-axis is performed (step S7) after performing the positioning of the X1-axis and the X2-axis (step S6).

Thus, the axis to be superposed is positioned when performing the superposition of one axis, so that the programmer who prepares the processing program can easily grasp the positional relation between the tool and the work.

When the superposition is completed, the processing of the work W1 by the tool T1 and the processing of the work W2 by the tool T2 are performed at the same time according to the NC processing program (step S8).

When the processing is finished (step S9), the superposition is cancelled (step S10), and waiting is performed until the next processing.

Furthermore, the description has been given supposing that the existence of superposition is confirmed at the step S1, step S2, and step S5, but this confirmation can be omitted.

Figure 10:
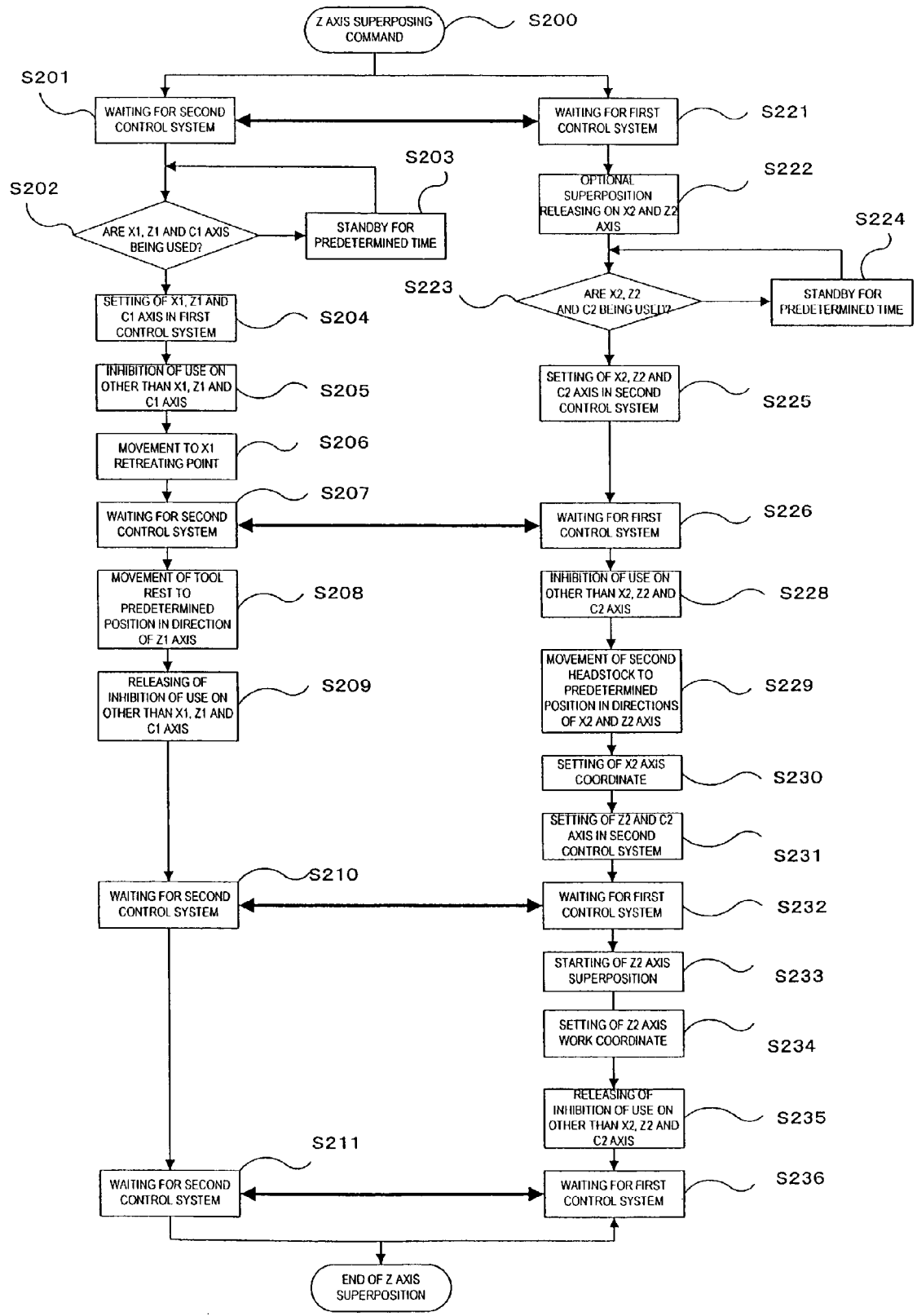
FIG. 10 is a flow chart explaining the procedure of the superposition of the Z1-axis and the Z2-axis.
Figure 11:
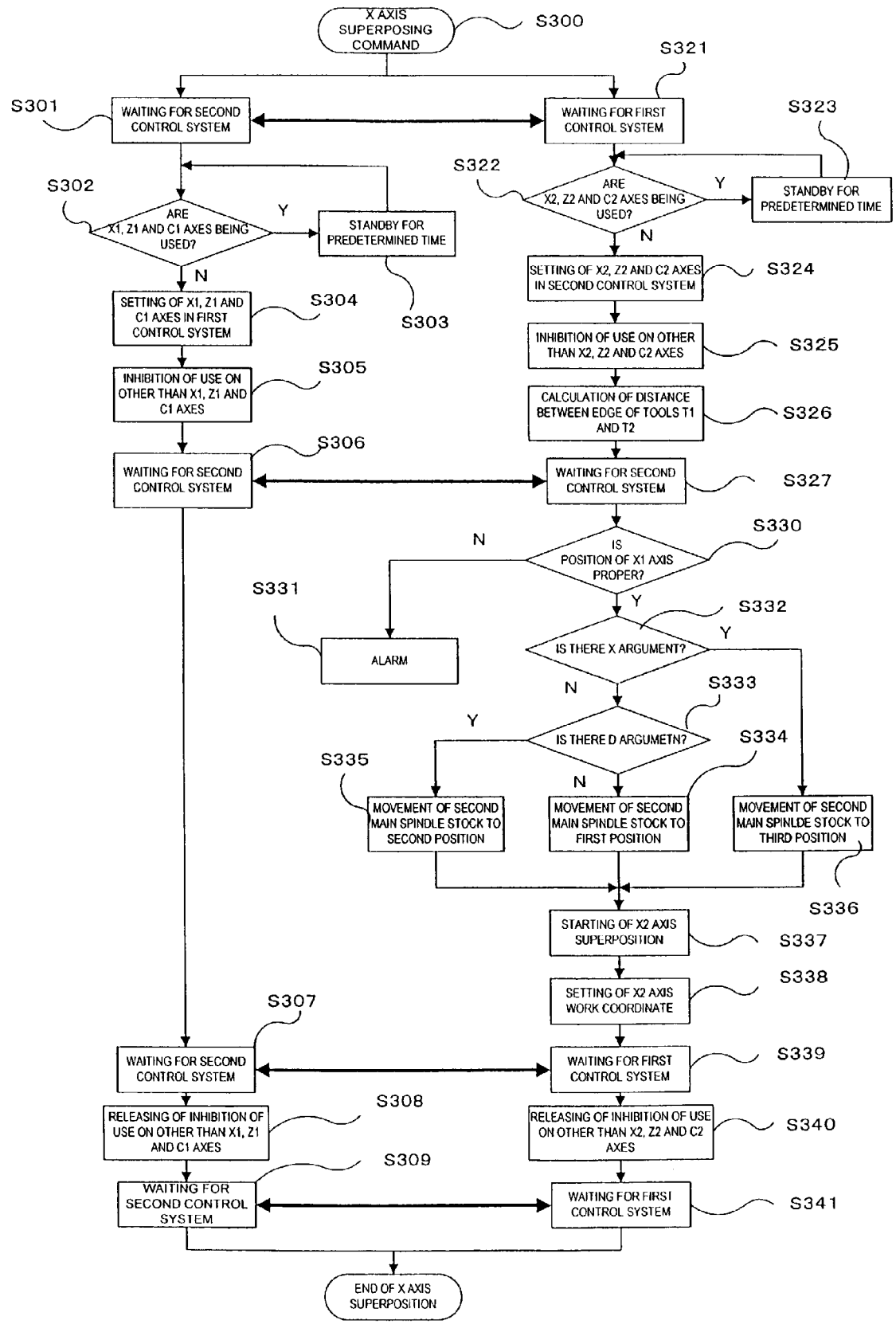
FIG. 11 is a flow chart explaining the procedure of the superposition of the X1-axis and the X2-axis.
Figure 12:
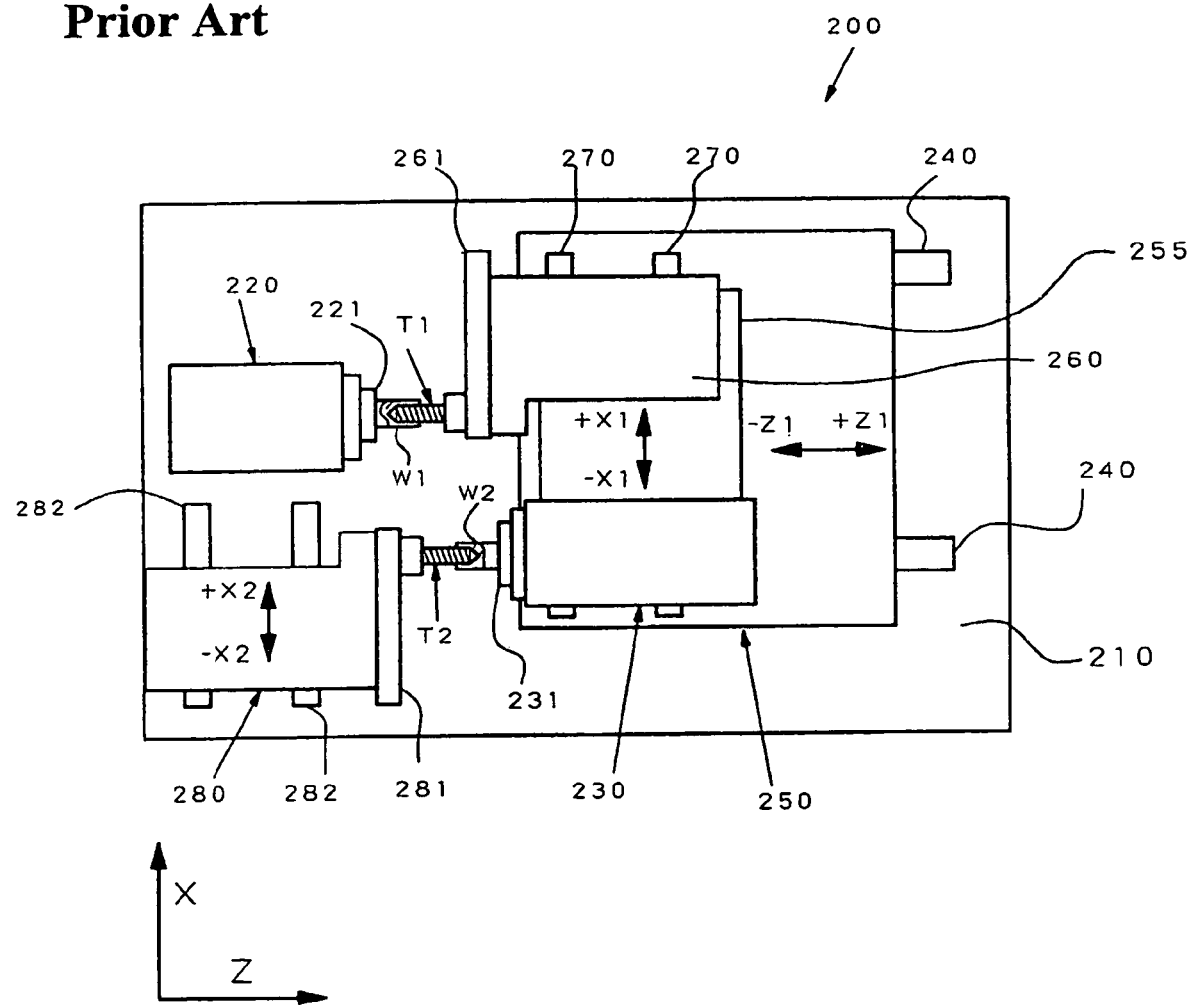
FIG. 12 is a plan view explaining the rough structure of the NC lathe according to a conventional example of the present invention.

Next, the concrete procedure of the superposition of the Z1-axis and the Z2-axis, and the X1-axis and the X2-axis will be described according to the flow charts in FIG. 10 and FIG. 11.

In the following description, the description will be given supposing that two sets of superposition of the Z1-axis and the Z2-axis, and the X1-axis and the X2-axis, and that the superposition of the X1-axis and the X2-axis is performed after completing the superposition of the Z1-axis and the Z2-axis.

[Z-Axis Superposition]

When there is a Z-axis superposition command in the NC processing programs (step S200), the queuing for the execution start timing of the program of the Z1-axis and the Z2-axis is performed (steps S201, 221).

In the first control system (system on the left side of the flow chart in FIG. 10), whether the X1-axis, the Z1-axis, or the C1-axis (rotational axis around the Z1-axis) is used or not is judged (step S202). In the case where either or all of the X1-axis, the Z1-axis, and the C1-axis are in use, the preparation work is stopped for a specified time and waiting is performed (step S203), and the waiting is continued until none of the X1-axis, the Z1-axis, and the C1-axis is used.

If none of the X1-axis, the Z1-axis, and the C1-axis is used, new axes X1, Z1, C1 for the processing are set in the first control system (step S204).

After this, the use of the X1-axis, the Z1-axis, and the C1-axis in another control system is prohibited (step S205), and the tool rest 160 is moved to the retreat position specified on the X1-axis (step S206), queuing for the second control system is performed (step S207).

In the second control system (system on the right side of the flow chart in FIG. 10), after performing the timing set of the execution start of the NC processing program (step S221), the superposition ordered to the X2-axis and the Z2-axis is cancelled (step S222). Next, whether the X2-axis, the Z2-axis, or the C2-axis (rotational axis around the Z2-axis) is used or not is judged (step S223). In the case where either or all of the X2-axis, the Z2-axis, and the C2-axis are in use, stopping is performed for a specified time and waiting is performed (step S224), and the waiting is continued until none of the X2-axis, the Z2-axis, and the C2-axis is in use.

If none of the X2-axis, the Z2-axis, and the C2-axis is in use, new axes X2, Z2, C2 are set in the second control system (step S225).

When the processing is completed, queuing for the first control system is performed (step S226).

After the completion of the queuing (steps S207, S226), the first control system moves the tool rest 160 in the direction of the X1-axis and the direction of the Z1-axis until the distance between the tool T1 and the work W1 becomes a previously set distance (positional relation) (step S208).

After this, the prohibition of use of the X1-axis, the Z1-axis, and the C1-axis in another control system is cancelled (step S209), and queuing for the second control system is performed (step S210).

In the second control system, after the completion of queuing (steps S207, 226), the use of the axes X2, Z2, C2 in another control system is prohibited (step S228). Then, the second headstock 130 is moved in the direction of the Z2-axis and the direction of the X2-axis, so that the distance between the tool T2 and the work W2 becomes a previously determined distance (positional relation) (step S229). Then, the coordinate system of the work W2 on the X2-axis at this position is set (step S230), and new axes Z2, C2 are set in the second control system (step S231). Consequently, the command to the X2-axis is nullified, and the position in the direction of the X2-axis of the work W2 is fixed.

After this, queuing for the first control system is performed (step S232).

After the completion of the queuing (steps S210, 232), the superposition of the Z2-axis is started (step S233), and the coordinate system of the work W2 in the Z2-axis is set (step S234). The prohibition of use of the X2-axis, the Z2-axis, and the C2-axis in another control system is cancelled (step S235), and queuing for the first control system is performed (step S236).

If the queuing is completed (steps S211, S236), the superposition of the Z1-axis and the Z2-axis is completed.

[X-Axis Superposition]

When there is a superposition command of the X-axis (step S300), the execution timing of the program is matched in the first control system and the second control system (steps S301, S321).

In the first control system, whether the X1-axis the Z1-axis, or the C1-axis is used or not is judged (step S302), and in the case where it is used, waiting is performed for a specified time (step S303), and the waiting is continued until none of the X1-axis, the Z1-axis, and the C1-axis is in use.

If none of them is in use, new axes X1, Z1, C1 are set in the first control system (step S304). Then, the use in another control system is prohibited (step S305), and queuing for the second control system is performed (step S306).

In the second control system, after performing the timing matching of the execution start of the program (step S321), whether the X2-axis, the Z2-axis, or the C2-axis is in use or not is judged (step S322), and in the case where it is in use, waiting is performed for a specified time (step S323), and the waiting is continued until none of the X2-axis, the Z2-axis, and the C2-axis is in use.

If none of them is in use, new axes X2, Z2, C2 are set in the second control system (step S324), and the use of these axes in another control system is prohibited (step S325).

After this, in the second control system, the coordinate positions of the edge of the first tool T1 and the edge of the second tool T2 are stored in a memory, and in the meantime, the distance H1 in the direction of the X2-axis between these coordinate positions is stored in the memory (step S326). When the processing is finished, queuing for the first control system is performed (step S327).

After the completion of the queuing (steps S306, S327), the coordinate of the processing original point O1 of the work W1 is found (step S329), and whether the position of the second headstock 130 is a position suitable for the superposition or not is judged from this coordinate position (step S330).

The judgment can be performed, for example, by using the judgment of whether the edge of the tool T2 is separated from the tool rest 160 in the direction of the X1-axis furthermore than the processing original point O1 of the first work W1 (whether it is positioned lower than the axial line of the first spindle 121 which passes through the processing original point O1 or not, in the example in FIG. 2), as the basis of judgment of whether it is suitable for the superposition or not.

More particularly, when the edge of the tool T2 is positioned at a position upper than that of the spindle axial line of the first spindle 121, it is judged to be unsuitable for the superposition by considering that it is positioned out of the movable range of the X2-axis of the second headstock 130.

Accordingly, in such a case, the alarm state is made (step S331).

If the superposition is possible, the initial position of the second headstock 130 is determined. In this embodiment, as the initial position of the second headstock 130, a first position where the processing original point O2 of work W2 (positioned on the spindle axial line of the second spindle 131) is positioned at a position separated from the tool rest 160 furthermore than the processing original point O1 of the work W1 on the first headstock 120 side by the distance H1 in the direction of the X2-axis, a second position which is determined in advance regardless of the works W1, W2 or the processing form, and a third position which can optionally be set by the worker are prepared.

Which position is selected from among these first position, second position, and third position can be determined, for example, by the argument submitted to the NC program. It can be arranged that the existence of the X-argument of the NC program is judged (step S332) to select the third position, and that the existence of the D-argument is judged (step S333) to select any one of the first position (step S334) or the second position (step S335).

After selecting a suitable position from among the first position, second position, and third position, the superposition of the X2-axis is started (step S337), and the work axis of the X2-axis is set (step S338).

If the above processing is finished, queuing for the first control system is performed (steps S307, 339).

After the completion of the queuing, the prohibition of use of each axis in another control system is cancelled (steps S308, S340), and queuing for each other is performed (steps S309, S341), and the superposition of the X1-axis and the X2-axis is completed.

In the superposition of the Z-axis and superposition of the X-axis, it may be set that after performing one, the other is performed, but it may also be set that both are performed at the same time.

Furthermore, it is preferable that the procedure of the Z-axis superposition and the procedure of the X-axis superposition are macro-programmed. By performing the macro-programming, the processing program is simplified, and the superposition work can easily be performed.

The preferred embodiments of the present invention have been described, but the present invention is not limited at all by the embodiments.

For example, the description has been given supposing that the relative rotation of the work to the rotational tool such as a drill mounted on the tool rests 160, 180 is performed by rotating the first spindle 121 or the second spindle 131, but it is also possible that a rotational driving mechanism for rotating the tool is provided to the tool rests 160, 180 so that a rotational tool such as a drill or an end mill mounted on the tool rests 160, 180 can be rotated. if the structure is made like this, it becomes possible that a rotational tool such as a drill or an end mill is mounted on the tool rests 160, 180 to apply the processing such as drilling or key groove cutting to the peripheral surface of the works W1, W2, and the versatility in processing by the NC lathe of the present invention and the processing method can furthermore be improved.

According to the present invention, it becomes possible to perform the superposing of the movements of at least two axes which are not in parallel relation like the X1-axis and the X2-axis, and the Z1-axis and the Z2-axis, and it becomes possible to apply at least at the same time a plurality of kinds of different processing to a plurality of works held by a plurality of spindles by a plurality of tools mounted on one tool rest. Consequently, the reduction of processing time can be achieved, and furthermore, a small-sized and cheap numerical control lathe can be obtained by making the structure of the numerical control lathe simple and compact.

Furthermore, it is possible to apply at the same time the processing whose variety is more than that in the past to works held by two spindles, and therefore, the reduction of the processing time can be achieved, and furthermore, the price of the numerical control lathe and the processing cost of the work by the numerical control lathe can largely be lowered.

INDUSTRIAL APPLICABILITY

The present invention can be applied to not only a numerical control lathe having two headstocks and at least one tool rest but also a numerical control lathe having two or more tool rests. Furthermore, it can be applied to not only the cutting processing or drilling processing but also the groove cutting processing by an end mill or the screw cutting processing by a tap, by attaching a rotational tool to the tool rest.

What is claimed is:

1. A numerical control lathe comprising: a first headstock and a second headstock which are arranged to face each other; a first spindle which is supported by the first headstock and a second spindle which is supported by the second headstock; a tool rest which has tools for processing works held by the first spindle and the second spindle; and a numerical control unit which controls rotation of the first spindle, rotation of the second spindle, and relative movement of the tool rest to the first headstock or the second headstock, wherein the tool rest has a first tool for processing a work held by the first spindle and a second tool for processing a work held by the second spindle, and is freely movable in a direction of a Z1-axis in parallel with a spindle axial line of the first spindle and in a direction of an X1-axis at right angles thereto, the second headstock is freely movable in a direction of an X2-axis and a direction of a Z2-axis in parallel with the X1-axis and the Z1-axis of the tool rest, and the numerical control unit superposes movement in the direction of the X2-axis necessary for processing the work held by the second spindle by the second tool on movement in the direction of the X1-axis, and superposes movement in the direction of the Z2-axis necessary for processing the work held by the second spindle by the second tool on movement in the direction of the Z1-axis.

2. The numerical control lathe according to claim 1, wherein the numerical control unit comprises a first control system which controls the movement in the direction of the X1-axis and the movement in the direction of the Z1-axis of the tool rest and a second control system which controls the movement in the direction of the X2-axis and the movement in the direction of the Z2-axis of the second headstock.

3. The numerical control lathe according to claim 2, wherein a first tool and a second tool are mounted on the tool rest so that a relation between an edge position of the second tool and an edge position of the first tool has a specified positional relation, and that the second control system determines an initial position of the second headstock so that a position of a processing original point of the work held by the second spindle relative to a processing original point of the work held by the first spindle is set on a basis of a positional relation between the first tool and second tool.

4. The numerical control lathe according to claim 3, wherein a distance in a direction of an X-axis between the edge of the first tool and the edge of the second tool is larger than a maximum value of a movement distance in the direction of the X-axis when the work is processed by the first tool, and the edge position of the second tool is furthermore separated from the tool rest than the edge position of the first tool, and that a distance in a direction of a Z-axis between the edge of the first tool and the edge of the second tool is larger than a sum of a maximum value of a movement distance in the direction of the Z-axis when the work is processed by the first tool and a maximum value of a movement distance in the direction of the Z-axis when the work is processed by the second tool, and that the distances in the direction of the X-axis and the direction of the Z-axis between the processing original point of the work on the first spindle side and the processing original point of the work on the second spindle side are corresponding to the distances in the direction of the X-axis and the direction of the Z-axis between the edges of the first tool and the second tool.

5. The numerical control lathe according to claim 2, further comprising a second tool rest with a third tool for processing the work held by the first spindle, wherein the first headstock is movable at least in a direction of a Z0-axis along a spindle axial line of the first spindle, and that the first control system can superpose at least a movement in the direction of the Z1-axis necessary for processing the work held by the first spindle by the first tool on a movement in the direction of the Z0-axis.

6. A processing method of a work in a numerical control lathe comprising: a first headstock and a second headstock which are arranged to face each other; a first spindle which is supported by the first headstock and a second spindle which is supported by the second headstock; and a tool rest which has tools for processing works held by the first spindle and the second spindle, wherein to the tool rest, a first tool for processing a work held by the first spindle and a second tool for processing a work held by the second spindle are mounted, the tool rest is moved in a direction of a Z1-axis in parallel with a spindle axial line of the first spindle and in a direction of an X1-axis at right angles thereto, the second headstock is movable in a direction of an X2-axis in parallel with the X1-axis of the tool rest and a direction of a Z2-axis in parallel with the Z1-axis, and a movement in the direction of the X2-axis of the second headstock necessary for processing of the work by the second tool is superposed on a movement in the direction of the X1-axis, and a movement in the direction of the Z2-axis of the second headstock necessary for processing of the work by the second tool is superposed on a movement in the direction of the Z1-axis, and the second headstock is moved in the direction of the X2-axis and the direction of the Z2-axis, and a processing of the work of the first spindle by the first tool and a processing of the work of the second spindle by the second tool are performed at the same time.

7. The processing method of a work in a numerical control lathe according to claim 6, wherein the first tool and the second tool are mounted on the tool rest so that a relation between an edge position of the second tool and an edge position of the first tool has a specified positional relation, and that a processing start position of the second headstock is determined so that a position of a processing original point of the work held by the second spindle relative to a processing original point of the work held by the first spindle is equal to a positional relation between the first tool and second tool.

8. The processing method of a work in a numerical control lathe according to claim 7, wherein a distance in a direction of an X-axis between an edge of the first tool and an edge of the second tool is larger than a maximum value of a movement distance in the direction of the X-axis when the work is processed by the first tool, and the edge position of the second tool is furthermore separated from the tool rest than the edge position of the first tool, and that a distance in a direction of a Z-axis between the edge of the first tool and the edge of the second tool is larger than a sum of a maximum value of a movement distance in the direction of the Z-axis when the work is processed by the first tool and a maximum value of the movement distance in the direction of the Z-axis when the work is processed by the second tool, and that the distances in the direction of the X-axis and the direction of the Z-axis between the processing original point of the work on the first spindle side and the processing original point of the work on the second spindle side are corresponding to the distances in the direction of the X-axis and the direction of the Z-axis between the edges of the first tool and the second tool.

9. The processing method of a work in a numerical control lathe according to claim 6, wherein among a set of the X1-axis and the X2-axis and a set of the Z1-axis and the Z2-axis which are superposed, positions of axes of any one set are positioned at previously set first positions to perform superposition of the one set, and in a state where the axes of the one set whose superposition is completed are positioned at the first position, positions of axes of the other set are positioned at a previously set second position to perform superposition of the other set.

10. The processing method of a work in a numerical control lathe according to claim 9, wherein a procedure for performing the superposition of the set of the X1-axis and the X2-axis or the superposition of the set of the Z1-axis and the Z2-axis is defined and macro-programmed in advance, and a macro-program is executed to perform the superposition when a command of performing the superposition of the set of the X1-axis and the X2-axis or the superposition of the set of the Z1-axis and the Z2-axis is inputted.

* * * * *